UNITED STATES PATENT OFFICE 2,038,720

PROCESS FOR INCREASING THE PRODUCTIVITY OF WELLS

Melvin De Groote, St. Louis, Mo., assignor to Tretolite Company, Webster Groves, Mo., a corporation of Missouri No Drawing. Application February 17, 1936, Serial No. 64,345

5 Claims. (Cl. 166—21)

This invention relates to a novel process for increasing the productivity of deep wells, such as oil wells, gas wells, water wells and brine wells. In view of the fact that the most important industrial application of the process is concerned with oil wells, I will hereinafter describe how the process is used to increase the output of oil wells.

When an oil well is drilled into an oil-bearing stratum, the release of pressure upon the oil deposit may cause the oil to flow naturally for a certain period of time, after which the volume of flow will, in most instances, gradually decrease to a point or degree where some procedure, such as pumping, must be employed, so as to insure the production of a profitable amount of oil. Thereafter, production may continue to decline until the quantity of oil obtained from the well is so small that it is not commercially practicable to continue the well in operation. In some instances the stoppage of oil output or decline in production, above referred to, is not caused by exhaustion of the oil supply, but, on the contrary, is caused by building up of solid deposits of wax, or of inorganic salts, in the channels or pores of the oil-bearing rock. The productivity of wells of the kind above mentioned may, in some instances, be wholly, or at least partially, regenerated by mechanical means, such as the use of an explosive, but there are various objections to such mechanical treatment, such as the high cost and danger of injuring the internal well structure itself.

In such instances where the hydrocarbon gases, escaping from a well, lower the solubility of wax or paraffin bodies in the oil, with the result that wax or paraffin-like bodies are deposited in the oil-bearing stratum, one is confronted with considerable difficulty in attempting to remove such wax or paraffin-like bodies, due to their chemical inactivity. Asphaltic materials may act the same as wax. Indeed, it is not necessary for the oil-bearing strata to be clogged entirely with wax or paraffin-like bodies, but, on the contrary, a mere coating or film of wax or paraffin on calcareous matter sometimes prevents ordinarily effective acid-treating agents, such as hydrochloric acid, from combining with or removing the calcareous deposit, and thus presents the same sort of difficulty.

There are a number of methods or processes, involving the use of hydrochloric acid, that are effective for treating a clogged oil-bearing stratum consisting of a lime sand, a limestone, or a formation related to calcareous or magnesian formation, provided the clogging is due essentially to uncoated calcium carbonate, or magnesium carbonate, or the like. This is also true in such siliceous or similar strata, from which petroleum oil is derived, where there is a clogging of the oil sands, due to the presence of alkaline earth carbonates, and primarily calcium carbonate. It is believed that the subterranean water becomes saturated with calcium bicarbonate under pressure, and that when the well is drilled and pressure released, some of the subterranean water escapes with the oil, with the result that the solubility of the calcium carbonate or bicarbonate in the remaining subterranean water becomes reduced to such an extent or degree that precipitation takes place in the pores of the siliceous sand in the oil-bearing stratum. So far as the usual hydrochloric acid treatment is concerned, it is immaterial whether the formation itself is truly calcareous or argillaceous, or is a siliceous formation with a calcareous deposit. Naturally, magnesium carbonate deposits are susceptible to treatment as calcium carbonate deposits.

Obviously, if hydrochloric acid treatment is applied to an oil-bearing limestone formation, it may not only remove any deposited calcium carbonate, or the like, but it may increase the porosity of the limestone structure itself. Therefore, in actual use, the increased productivity is not limited to the removal of the relatively recent calcium deposit, but it may also be concerned with the increased natural porosity of the aged oil-bearing stratum itself. Some oil-bearing strata are not essentially calcareous in character, but may essentially be siliceous in character, or else, may represent limestone so high in siliceous content that there is limited or no chemical reactivity towards hydrochloric acid.

It is well known, of course, that hydrofluoric acid attacks silica, with the resultant production of water and silicon tetrafluoride, the latter being a gas. Commercial efforts to use hydrofluoric acid to increase the production of oil wells has encountered the following difficulties: Hydrofluoric acid is relatively expensive; it is exceedingly dangerous to handle, because it is highly toxic; and burns from hydrofluoric acid are exceedingly difficult to heal. Hence, the industrial hazard involved in handling hydrofluoric acid practically prohibits its application in the hands of any but trained chemists and highly skilled technicians.

It is difficult to add an inhibitor to hydrofluoric acid that will reduce its activity towards iron in the manner that the activity of hydrochloric acid towards iron may be reduced by the addition of an inhibitor. Hydrofluoric acid has enormous avidity for iron and iron oxides, and is often used as the basis of rust-removing preparations. Hydrofluoric acid, of course, could be emulsified so as to produce a hydrofluoric acid in oil emulsion in the manner described in U. S. Patent No. 1,922,154, dated April 15, 1933, to Melvin De Groote. Even under these circumstances, ignoring other objections previously noted, numerous problems still exist. Silicon tetrafluoride reacts with water to re-liberate hydrated silica and hydrofluosilicic acid. The latter especially, in the presence of silicic acid, may give a gelatinous mass, which may tend to clog the structure being treated.

One method of overcoming, or partially overcoming, the difficulties above referred to, is to employ a salt of hydrofluoric acid, such as sodium fluoride, which is non-corrosive, and permits reaction to take place with a suitable acid, such as hydrochloric acid, or nitric acid in situ. Such a method is described in U. S. Patent No. 1,990,969, dated February 12, 1935, to Wilson. However, any of the conventional processes, which contemplate the use of sodium fluoride, or the like, and hydrochloric acid, encounter the difficulty that the two materials cannot be introduced into the well structure simultaneously, in contact with each other, since premature liberation of hydrofluoric acid would take place. The operative procedure usually employed is to introduce the materials into the well structure by what is known as the slug method. For instance, there may be first introduced into the well a slug of 10% to 25% of the total acid to be used, and then alternate slugs of fluoride and acid, each slug comprising from 2% to 3% up to 10% to 15% of the materials to be introduced. In other words, there may be as many as thirty to fifty individual slugs of sodium fluoride solution or suspension injected in a sort of rhythmical fashion between slugs of acid. The entire effort is hypothecated on the basis that more or less uniformity of mixed reagent is obtained within the oil-bearing stratum. This is necessary, because in the absence of an excess of hydrochloric acid over and above a stoichiometrical equivalent required to react with the sodium fluoride, there will occur the formation of gelatinous, siliceous matter, as previously explained.

Where the structure being treated is not entirely siliceous, but contains some calcareous matter, it is evident that the slug of hydrochloric acid may react, in part, with calcium carbonate present, and not be totally available for the sodium fluoride subsequently injected. Such difficulty may be overcome by the addition of a greater proportion of hydrochloric acid than required by some ordinarily suitable excess, say, more than a 10% excess above stoichiometrical equivalent. No satisfactory solution of the problem, however, is obtained, unless the ratio of hydrochloric acid or other acid to fluorine or to fluoride content, is maintained at a constant predetermined ratio as the reagents are injected into the oil-bearing stratum, and thereafter, while reacting with the stratum. The most satisfactory results are obtained by an assured means for injecting the reactive mixture in a temporarily inactive state, with a predetermined hydrochloric acid to fluoride content, into the stratum with assurance that such selected ratio will remain substantially unchanged.

I have found that it is possible to accomplish this desired result by preparing a solution of sodium fluoride, or suspension of sodium fluoride, or any other suitable fluoride, such as calcium fluoride, so as to form an emulsion of the water-in-oil type, and also prepare another emulsion of hydrochloric acid in oil, in the manner described in the De Groote patent previously referred to, or in any other manner, and then combining said emulsions so as to produce a treating agent. Of course, it is often possible to produce the treating agent by preparing only one emulsion in which the aqueous sodium fluoride is emulsified into the selected oily vehicle containing the oil-soluble or oil-wettable demulsifying agent, and then subsequently emulsify therein the hydrochloric acid of suitable strength and in proper amount. Such an emulsion contains two different internal phases, one an aqueous sol or suspension of sodium fluoride, and the other being aqueous hydrochloric acid, and the emulsion being characterized by the fact that the two do not re-act until the emulsion is injected or forced into the stratum, where it demulsifies, due to the capillarity of the structure, or for other reasons. The ratio of acid to fluoride is predetermined, and the emulsion can be forced into the stratum without variation in predetermined ratio. Furthermore, as the emulsion breaks in the formation, the ratio of acid to fluoride is homogeneously the same throughout the stratum.

As previously stated, the water-in-oil emulsion or emulsions employed in the present process may be produced or manufactured in the manner described in the De Groote patent previously mentioned, or in any other suitable way. The emulsifying agent employed is one which is colloidally soluble or wettable by the oily vehicle, and is not chemically reactive with hydrochloric acid or whatever acidifying agent is employed. Suitable emulsifying agents include petroleum sulfonic acids, petroleum asphalt, oil-soluble pitches derived from certain fatty acids, etc. Generally speaking, 2% to 5% of the emulsifying agents are added to the selected vehicle and the clear solution or suspension of the fluoride added, whereupon the emulsion is produced. The emulsion of hydrochloric acid or other suitable acid is produced in the same way.

It is well known that crude oils, especially those produced west of the Mississippi, are characterized by the presence of water-in-oil emulsions, i.e., many naturally-occurring crude oils contain emulsifying agents which tend to produce water-in-oil emulsions. Some crude oils contain such a large percentage of desirable emulsifying agents for the water-in-oil type of emulsion, that such oils may be used to produce the treating agent contemplated by my process, without adding additional emulsifying agents, or, at the most, adding very little emulsifying agent to the crude oil. Heavy black oils of the type above referred to are produced in the following territories: The Cayoga Field in North Texas; Smackover Eldorado Field in Arkansas; Poison Spider Field in Wyoming; Casmalia Field in California, and certain fields near Ardmore, Oklahoma. Oils of this particular type are characterized by their ability to produce satisfactory emulsions with aqueous suspensions of sodium or calcium fluoride, and also with hydrochloric acid, or some other suitable acid.

The treating agent that I prefer to use in practicing my process may be produced in the following manner: Approximately 115 gals. of 10% hydrochloric acid solution, by weight, is emulsified in sufficient oil to produce 400 gals. of acid emulsion. A second emulsion is then prepared by emulsifying 100 gals. of a 10%, by weight, solution-suspension of sodium fluoride in 400 gals. of oil. Sodium fluoride will dissolve in water, depending upon the temperature, to approximately 3½%, or thereabouts, and thus, when 10% of finely divided sodium fluoride is mixed with water and churned intimately, approximately one-third goes into true solution and the other two-thirds remains as a suspension, and therefore, such an aqueous mixture has been referred to as a solution or suspension. If desired, a trace of a suitable deflocculating agent, such as tannin, may be added to this sodium fluoride suspension, in order to keep the insoluble fluoride more efficiently suspended. The two emulsions, prepared separately, as above described, are then admixed until the mass is homogeneous throughout.

In practicing my process the homogeneous mixture above described is injected into the formation in the manner described in the previously mentioned De Groote patent, or in any other suitable way. Since the application date of said De Groote patent there has been developed numerous mechanical devices, particularly adapted for injecting hydrochloric acid into the strata under varying conditions. Such devices and procedure may be employed advantageously in my process to force the sodium fluoride-hydrochloric acid emulsion into the strata. The ratios of sodium fluoride to hydrochloric acid should be such that there is always an excess of hydrochloric acid. If the deposit is calcareous in nature, so that the structure will react with the hydrochloric acid simultaneously while reaction takes place with the sodium fluoride, then there should be an increase in the ratio of hydrochloric acid to fluoride. It is understood, of course, that the concentrations may be varied in regard to the strength of the aqueous hydrochloric acid, or in regard to the sodium fluoride solution or suspension. One reagent might be emulsified with more or less oil than the other reagent. If desired, the stratum may be subjected to a second treatment, in which the strength of the acid is either increased or decreased with respect to the strength of the acid used in the first treatment. In some instances, it might even be desirable to follow the final acid treatment with some sort of alkali treatment, which need not, of course, be emulsified, because it is not corrosive.

While hydrochloric acid is preferably used in the present process, it is, of course, obvious that any other suitable acid such as sulfuric acid, nitric acid, phosphoric acid, etc., might be employed. Sulphuric acid would be objectionable in such instances where insoluble calcium sulfate might be formed. It is further understood that any suitable fluoride might be used, as, for example, calcium fluoride with hydrochloric acid. Naturally, the amount of acid and fluoride introduced depends upon the nature of the structure, the depth of sand, the porosity, the time required to force the materials into the formation, etc. In general, the technique employed for introducing the materials constituting the treating agent of my process, are substantially the same or obvious modification of the procedure employed in introducing non-emulsified hydrochloric acids with or without an inhibitor, or introducing emulsified hydrochloric acid as described in the aforementioned De Groote patent.

I do not wish it to be understood that the industrial use of my process is limited to those deposits which are essentially siliceous in character. As previously indicated, a deposit may be essentially calcareous in character, and yet, there may be deposited homogeneously throughout the calcareous deposit sufficient clayey or siliceous matter to retard or prevent active operation of the usual hydrochloric acid processes. In such instances the present hydrochloric acid sodium fluoride emulsion process may be applied primarily as a preliminary step for removal of sufficient siliceous matter to allow subsequent treatment by any of the conventional hydrochloric acid methods, without the deleterious or objectionable effects of siliceous matter being present. In such combined acid-fluoride emulsion treatment, followed by a hydrochloric acid treatment, the present process becomes only one step or a preliminary step in the whole process.

A suitable acid, such as hydrochloric acid, or nitric acid, reacts with a suitable fluoride, whether it be in the form of a true molecular solution, or in the form of a suspension of finely-divided material, or in a mixed form which represents both a suspension and a true solution, as previously described in regard to sodium fluoride. The word "solution", as employed in the claims, is intended to mean either a true aqueous solution, or an aqueous suspension, or a combination of the two.

If, under certain specific conditions, it would be desirable to use two dissimilar acids for liberating the hydrochloric acid, such as hydrochloric acid and sulfuric acid, there would be no objection to the employment of such mixture, provided that an excess of acid, as previously referred to, is employed. Similarly, two different acids, such as hydrochloric acid and nitric acid, might each be emulsified as separate phases in the oily vehicle, and subsequent reaction might be permitted between each of the acids and the fluoride employed. In this instance, also, it is necessary that the excess of acid be present. The hydrochloric acid employed in the present process may have an inhibitor added to it, if desired.

In the claims the acid treating medium is referred to as being homogeneous. Naturally, under a microscope an emulsion is not homogeneous, because it is diphasic. However, so far as any practical effect is concerned, the emulsified treating agent employed in the present process is homogeneous, in the sense that various samples, taken at different points prior to entrance into the strata, or immediately after entrance into the strata, would show the same acid to fluoride ratio. Similarly, successive samples of the emulsion, taken at the top of the well while the emulsion is being injected into the well, would show substantially the same composition.

Having thus described my invention, what I claim and desire to secure by Letters Patent is:

1. A process for increasing the productivity of wells, characterized by introducing into the well, a homogeneous treating medium consisting of an emulsion of the water-in-oil type, capable of passing the metallic parts of the well without causing any deleterious effects thereon, said emulsion being of the kind in which the dispersed part comprises at least two distinctly separate aqueous phases, one being a suitable acid solution and the other being a suitable fluoride solution adapted by their interaction to generate hydrofluoric acid in presence of excess acid, and said treating medium also having the following characteristics: 1st, the ratio of free acid to fluoride content is predetermined and constant; and 2nd, upon reaching the strata to be treated demulsification sets in, followed by liberation of hydrofluoric acid and reaction with the strata.

2. A process for increasing the productivity of wells, characterized by introducing into the well, a homogeneous treating medium consisting of an emulsion of the water-in-oil type, capable of passing the metallic parts of the well without causing any deleterious effects thereon, said emulsion being of the kind in which the dispersed part is composed of two distinctly separate aqueous phases, one being a suitable acid solution and the other being a suitable fluoride solution adapted by their interaction to generate hydrofluoric acid in presence of excess acid, and said treating medium also having the following characteristics: 1st, the ratio of free acid to fluoride content is predetermined and constant; and 2nd, upon reaching the strata to be treated demulsification sets in, followed by liberation of hydrofluoric acid and reaction with the strata.

3. A process for increasing the productivity of wells, characterized by introducing into the well, a homogeneous treating medium consisting of an emulsion of the water-in-oil type, capable of passing the metallic parts of the well without causing any deleterious effects thereon, said emulsion being of the kind in which the dispersed part is composed of two distinctly separate aqueous phases, one being a suitable hydrochloric acid solution and the other being a suitable fluoride solution adapted by their interaction to generate hydrofluoric acid in presence of excess acid, and said treating medium also having the following characteristics: 1st, the ratio of free acid to fluoride content is predetermined and constant; and 2nd, upon reaching the strata to be treated demulsification sets in, followed by liberation of hydrofluoric acid and reaction with the strata.

4. A process for increasing the productivity of wells, characterized by introducing into the well, a homogeneous treating medium consisting of an emulsion of the water-in-oil type, capable of passing the metallic parts of the well without causing any deleterious effects thereon, said emulsion being of the kind in which the dispersed part is composed of two distinctly separate aqueous phases, one being a suitable hydrochloric acid solution and the other being a suitable sodium fluoride solution adapted by their interaction to generate hydrofluoric acid in presence of excess acid, and said treating medium also having the following characteristics: 1st, the ratio of free acid to fluoride content is predetermined and constant; and 2nd, upon reaching the strata to be treated demulsification sets in, followed by liberation of hydrofluoric acid and reaction with the strata.

5. A process for increasing the productivity of wells, characterized by introducing into the well, a homogeneous treating medium consisting of an emulsion of the water-in-oil type, capable of passing the metallic parts of the well without causing any deleterious effects thereon, said emulsion being of the kind in which the dispersed part is composed of two distinctly separate aqueous phases, one being a suitable hydrochloric acid solution with a conventional inhibitor therein and the other being a suitable sodium fluoride solution adapted by their interaction to generate hydrofluoric acid in presence of excess acid, and said treating medium also having the following characteristics: 1st, the ratio of free acid to fluoride content is predetermined and constant; and 2nd, upon reaching the strata to be treated demulsification sets in, followed by liberation of hydrofluoric acid and reaction with the strata.

MELVIN DE GROOTE.